(12) United States Patent
Coak

(10) Patent No.: US 7,552,896 B2
(45) Date of Patent: Jun. 30, 2009

(54) AIRCRAFT WINDOW ASSEMBLY

(75) Inventor: Craig E. Coak, Kenmore, WA (US)

(73) Assignee: The Boeing Company, Chicago, IL (US)

( * ) Notice: Subject to any disclaimer, the term of this patent is extended or adjusted under 35 U.S.C. 154(b) by 361 days.

(21) Appl. No.: 11/358,421

(22) Filed: Feb. 21, 2006

(65) Prior Publication Data

US 2007/0194177 A1    Aug. 23, 2007

(51) Int. Cl.
*B64C 1/14* (2006.01)
(52) U.S. Cl. .......... 244/129.3; 244/119; 244/129.4; 244/121; 296/190.1
(58) Field of Classification Search .......... 244/118.5, 244/119, 129.3
See application file for complete search history.

(56) References Cited

U.S. PATENT DOCUMENTS

| | | | | |
|---|---|---|---|---|
| 2,414,705 | A * | 1/1947 | Ames | 296/201 |
| 2,473,616 | A * | 6/1949 | Stephenson | 244/129.3 |
| 2,679,467 | A * | 5/1954 | Sherts | 52/208 |
| 2,707,810 | A * | 5/1955 | Bolte | 52/204.595 |
| 2,716,529 | A * | 8/1955 | Czerwinski | 244/121 |
| 3,953,630 | A * | 4/1976 | Roberts et al. | 428/38 |
| 4,284,677 | A * | 8/1981 | Herliczek | 428/192 |
| 4,324,373 | A * | 4/1982 | Zibritosky | 244/121 |
| 5,271,581 | A * | 12/1993 | Irish | 244/129.3 |
| 5,443,912 | A * | 8/1995 | Olson | 428/425.6 |
| 6,168,112 | B1 * | 1/2001 | Mueller et al. | 244/129.3 |
| 6,736,352 | B2 * | 5/2004 | Bladt et al. | 244/129.3 |
| 6,818,281 | B2 * | 11/2004 | Blevins et al. | 428/194 |
| 6,905,094 | B2 * | 6/2005 | Dazet et al. | 244/129.3 |
| 7,143,979 | B2 * | 12/2006 | Wood et al. | 244/129.3 |
| 7,267,302 | B2 | 9/2007 | Coak et al. | |
| 2004/0238690 | A1 * | 12/2004 | Wood et al. | 244/129.3 |
| 2007/0095984 | A1 * | 5/2007 | Wood | 244/129.3 |
| 2007/0228217 | A1 * | 10/2007 | Bold | 244/129.3 |
| 2008/0048068 | A1 * | 2/2008 | Bold | 244/129.3 |
| 2008/0067288 | A1 * | 3/2008 | Eberth et al. | 244/129.3 |

FOREIGN PATENT DOCUMENTS

| | | |
|---|---|---|
| DE | 102004025383 | 12/2005 |
| EP | 0287692 | 10/1988 |
| FR | 2793106 | 11/2000 |
| WO | WO2004/011249 | 2/2004 |

OTHER PUBLICATIONS

International Search Report on corresponding PCT application (PCT/US2007/004316) from International Searching Authority (EPO) dated Jun. 23, 2008.
Written Opinion on corresponding PCT application (PCT/US2007/004316) from International Searching Authority (EPO) dated Jun. 23, 2008.

* cited by examiner

*Primary Examiner*—Michael R Mansen
*Assistant Examiner*—Brian M O'Hara
(74) *Attorney, Agent, or Firm*—Klein, O'Neill & Singh, LLP

(57) ABSTRACT

A window assembly is provided to prevent the migration of the window seal. The window assembly includes an outer window pane, an inner window pane and a seal. The outer window pane having a geometric feature configured to become parallel relative to another structure while the outer window pane rotates from a first position to a second position. The window assembly may further include a stiffening ring and a clamping ring which act to further secure the window seal in the desired position.

3 Claims, 5 Drawing Sheets

AIRCRAFT WINDOW ASSEMBLY

BACKGROUND

1. Field of the Invention

This invention relates generally to aircraft windows and specifically the prevention of window fogging.

2. Background of the Invention

Throughout the history of commercial aviation, airlines have experienced fogging, or the formation of condensation, on passenger windows on their aircraft.

There are numerous potential causes of fogging on passenger windows. One such cause of severe fogging on passenger windows has been found to be displaced seals in areas around the window edge. Generally, the rubber seal that normally surrounds the inner and outer acrylic panes of an aircraft window have been found to move, or 'migrate', off the edges of the panes.

FIG. 1A, is an illustration of a typical aircraft window 100 with a normal seal 102a within gap 104 between outer window pane 108 and surrounding aircraft structure. In contrast, FIG. 1B is an illustration of window 100 with a 'migrated' seal 102b within gap 104.

Once window seal 102a has moved away from its intended position, migrated seal 102b may no longer function properly. This condition can result in pressure leaking through gap 104 and/or external moisture entering window cavity 106, both of which can result in undesirable condensation forming in the cavity during routine operation of the aircraft.

The traditional solution for preventing window seal 102a from moving away from its intended position would be to make the edge of seal 102a thicker. This solution, however, is not weight effective.

Accordingly, what is needed is a device that properly retains the seal in the gap between the edge of outer window pane and the surrounding window frame structure in the most weight-effective manner possible.

SUMMARY OF THE INVENTION

The present invention includes features designed into components of a window assembly that act together to prevent window seal movement.

Certain features of the present invention are designed into components of the window assembly and act to physically restrain the window seal around its edge.

Other features are designed into the edge shape of the window outer pane to prevent it from applying a 'walking' force to the seal as it rotates caused by cyclic pressure loads during aircraft operation.

The combination of physical restraint of the window seal and change in shape of outer pane act together to ensure that the window seal cannot move or migrate off the edge of the window panes.

In one aspect of the present invention a window assembly is provided which includes an outer window pane, an inner window pane and a seal. The outer window pane includes a geometric feature configured to become parallel relative to another structure while rotating from a first position to a second position.

In another aspect of the present invention, a window assembly is provided which includes an outer window pane; an inner window pane; and a seal assembly. The seal assembly further includes a seal configured to physically restrain outer edges of the outer window pane and the inner window pane. The seal assembly also includes a stiffening ring made integral with the seal; and a clamping ring configured to restrain the seal about the outer and inner window panes.

The invention described herein provides solution to the seal movement problem in a weight efficient method, which is of critical consideration in design of aircraft components. In one embodiment of the present invention, a weight savings of more than 10 lbs. per aircraft may be realized over a more traditional solution of adding material at the edge of the window seal.

Additional advantages, objects, and features of the invention will be set forth in part in the detailed description which follows. It is to be understood that both the foregoing general description and the following detailed description are merely exemplary of the invention, and are intended to provide an overview or framework for understanding the nature and character of the invention as it is claimed.

BRIEF DESCRIPTION OF THE DRAWINGS

The accompanying drawings are included to provide further understanding of the invention, illustrate various embodiments of the invention, and together with the description serve to explain the principles and operation of the invention. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

Seal movement is typically caused by a combination of three main external influences on aircraft windows.

The first is the cyclic flexing of the acrylic panes from aircraft pressurization loads. As the panes flex outward at the center, the outer edges rotate, creating a back-and-forth motion with every pressurization cycle of the aircraft that when combined with the angle created between the edge and window frame can effectively 'walk' the seal off the edge of the panes.

The second is vibration caused by engines and flight loads during normal operation of the aircraft. Vibration causes the window panes, seal and surrounding structure to vibrate at their respective resonant frequencies. Over long periods of time, with the shape and mounting method of modern passenger windows, this resonance can directly result in movement of the seal on the edge of the window.

The third is external hydrodynamic forces impinging upon the seal at the edge of the window, the main source of which can be from pressure washers that may be used to clean the aircraft exterior or de-icing fluids applied during the winter season.

This invention includes features designed into components of the window assembly that act together to prevent seal movement caused by, for example, the external influences previously described.

Figure 2:
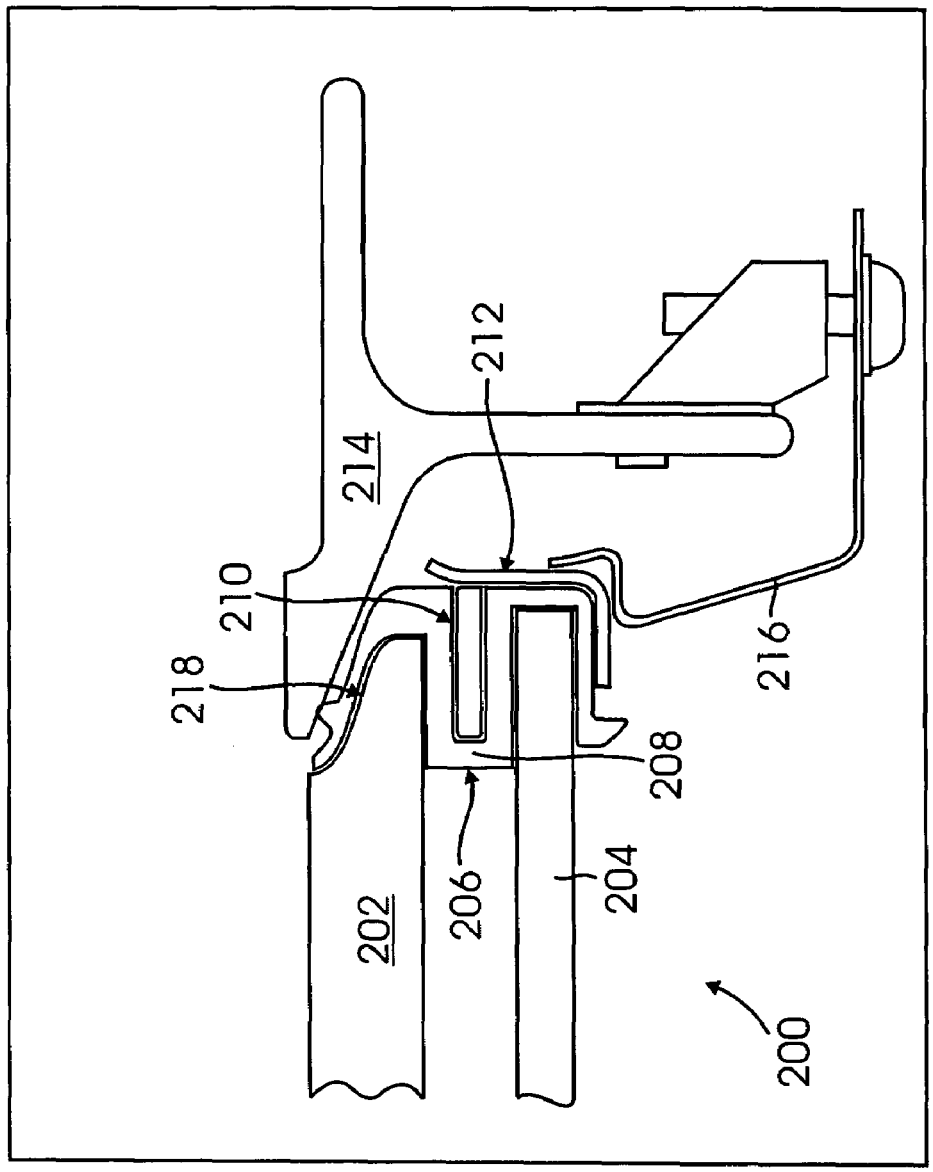
FIG. 2 is a simplified cross-sectional view of a window assembly with features to prevent window seal movement in accordance with an embodiment of the present invention.

As illustrated in FIG. 2, window assembly 200 in accordance with an embodiment of the present invention includes an outer pane 202, an inner pane 204, and window seal assembly 206. Window seal assembly 206 further includes a seal 208, an integral stiffening ring 210 and a clamping ring 212.

The remaining components of window assembly 200 may include all the components necessary to mount window panes 202 and 204 and seal assembly 206 to an aircraft, for example, window frame 214 and window retention clip 216, all of which are known to those of ordinary skill in the art.

Window assembly 200 includes features designed into components of window assembly 200 in accordance with embodiments of the present invention. The features rely upon mechanical engineering principles to prevent seal movement.

Figure 1A:
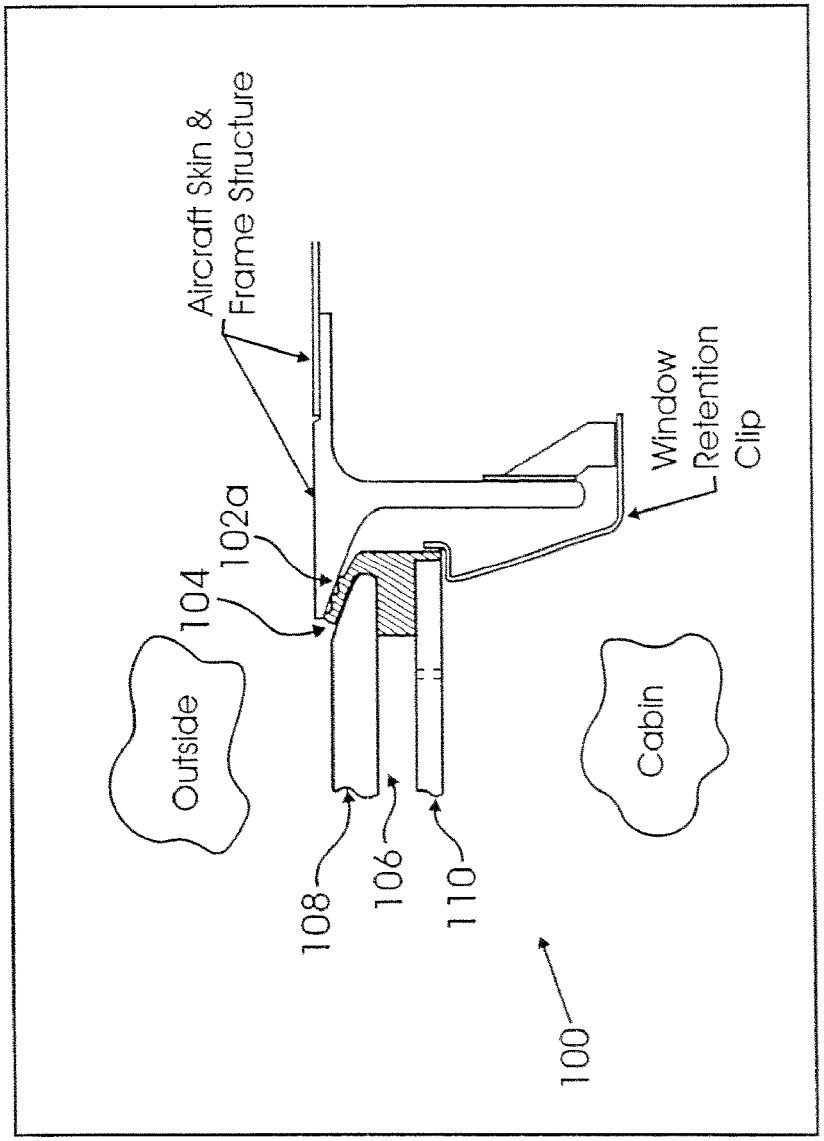
FIGS. 1A and 1B are simplified cross-sectional views of a typical aircraft window assembly.
Figure 1B:
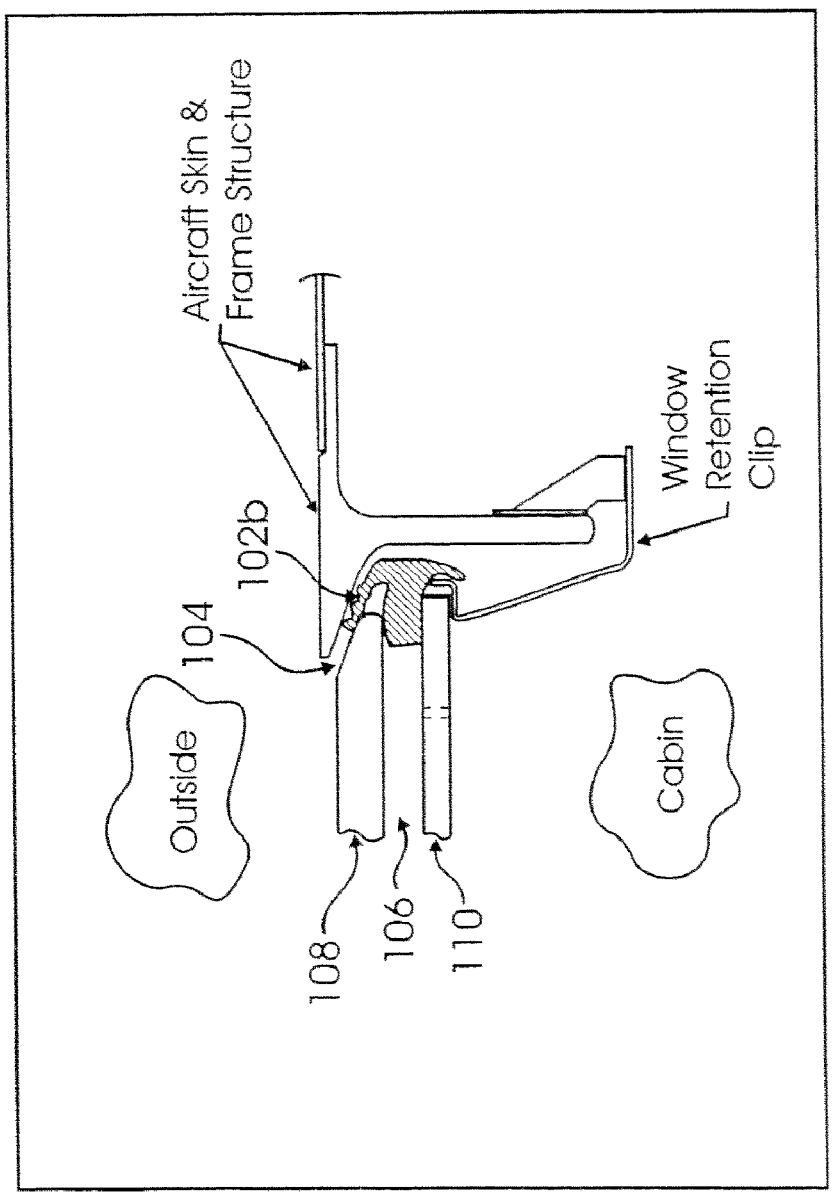
Figure 3:
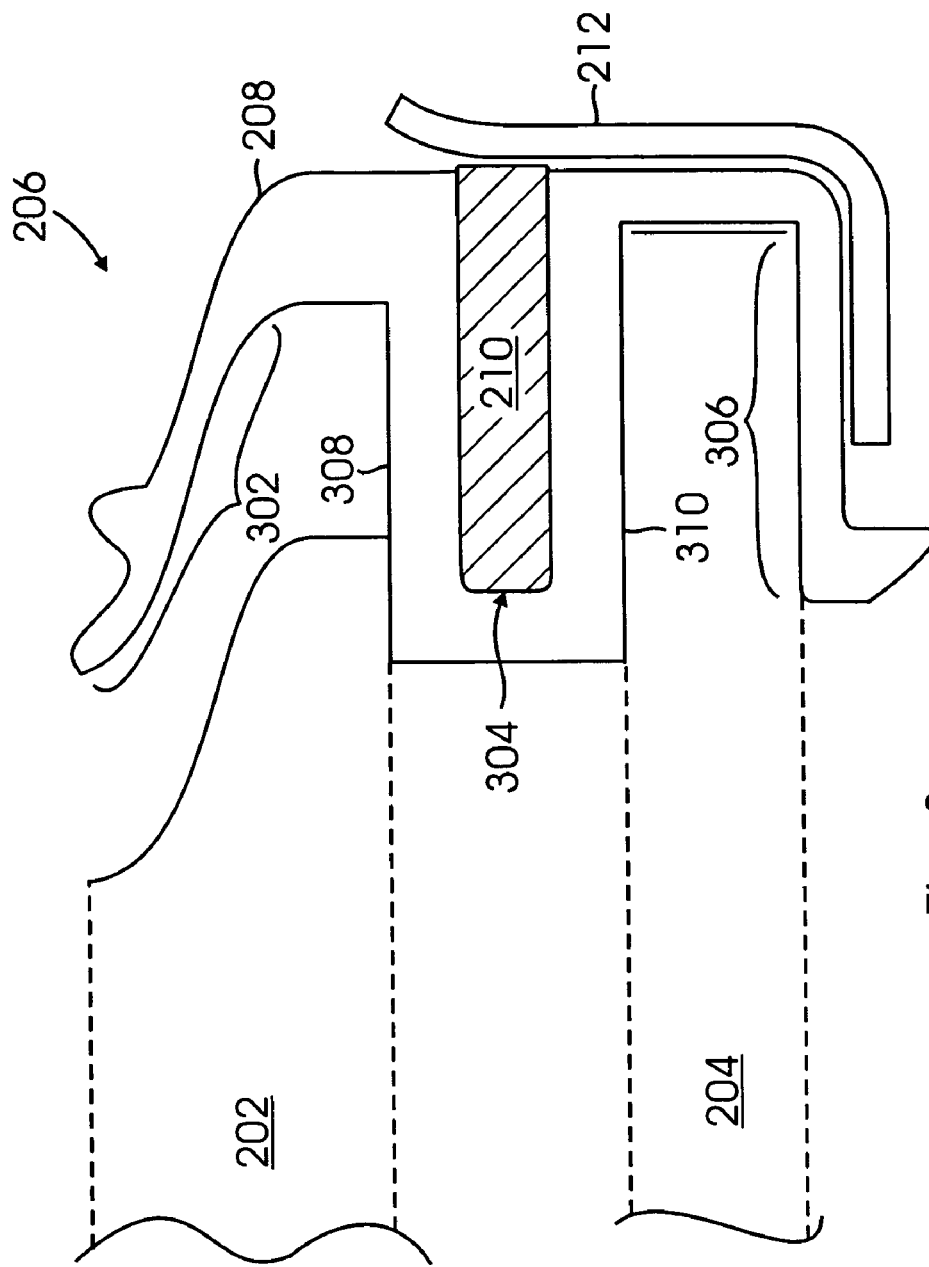
FIG. 3 is a simplified cross-sectional view of a window seal in accordance with an embodiment of the present invention.

Referring now to FIGS. 2 and 3, window seal assembly 206 includes a change to the shape of window seal 102a (FIG. 1) to create window seal 208, and the addition of integral stiffening ring 210 and clamping ring 212 in accordance with an embodiment of the present invention.

Window seal 208 includes a first portion 302, configured to match the contour of an outer window pane, such as that described in detail below. Window seal 208 also includes a second portion 304 defining a cut-out or channel configured to receive integral stiffening ring 210 as described in detail below. A third portion 306 of seal 208 is configured to extend around a portion of inner pane 204 to contact additional surface area thereon and to contact clamping ring 212. In this configuration, seal 208 is advantageously configured to physically restrain window seal 208 around outer edges of outer pane 202 and inner pane 204.

In accordance with an embodiment of the present invention, integral stiffening ring 210 may be embedded in the periphery of window seal 208 in cutout portion 304. Stiffening ring 210 acts to physically restrain window seal 208 to keep seal 208 in constant contact with outer and inner window panes 202 and 204 at edges 308 and 310. Stiffening ring 210 may be made of any suitable material, such as a material that has more stiffness than the seal material and which can provide stiffness to seal 208 to increase resistance to the forces that cause seal movement. Stiffening ring 210 may be either bonded or molded into seal 208, or alternatively, may be a separate component positioned in cutout portion 304 of seal 208 during the window assembling process.

Clamping ring 212 is a ring configured to surround the external periphery of the window seal and acts to physically restrain window seal 208, or alternatively window seal 208 and stiffening ring 210, in position against the inner and outer window panes. In one embodiment, clamping ring 212 has an L-shaped cross section. One leg of the L-shaped cross section contacts seal 208 adjacent to third portion 306, while the other leg extends to cutout portion 304.

Clamping ring 212 may be made from any suitable material, such as a material that has more stiffness than the window seal material, and that achieves a significant increase in stiffness from the L-shaped configuration.

Figure 4:
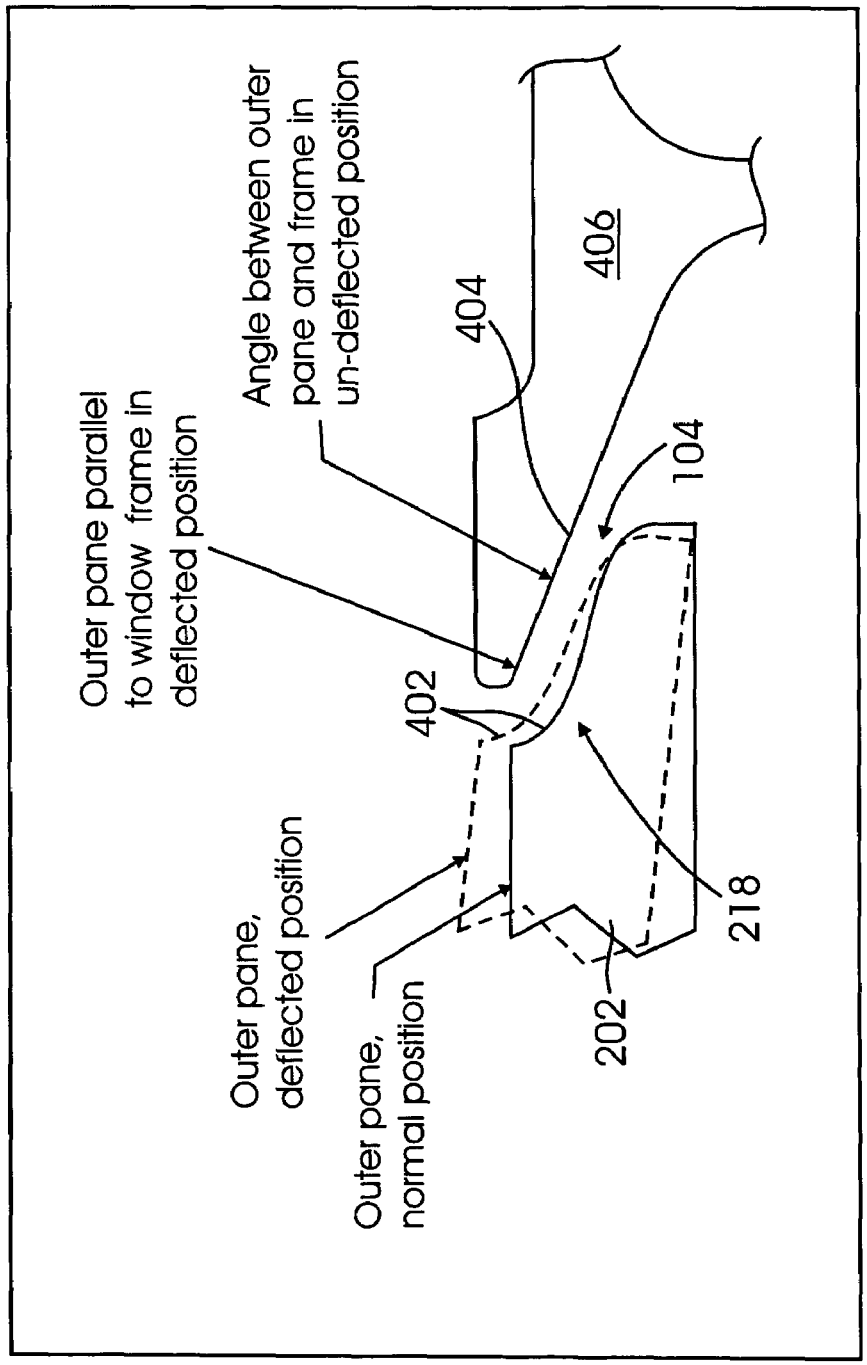
FIG. 4 is a simplified cross-sectional view of a window pane design in accordance with an embodiment of the present invention.

FIG. 4 is a simplified illustration of a feature 218 (FIG. 2) of outer window pane 202 which contacts the portion of seal 208 present in gap 104. Feature 218 includes a reconfigured edge portion designed to prevent the detrimental affects of the cyclic flexing of outer window pane 202 caused by aircraft pressurization loads. As illustrated in FIG. 4, as outer window pane 202 flexes outward at the center, the outer edge 218 rotates from a normal position shown in solid to a deflected position shown dashed. The movement is a back-and-forth motion occurring with every pressurization cycle of the aircraft.

Feature 218 that when combined with the angle created between feature 218 and the aircraft window frame can effectively prevent the back-and-forth movement from creating a force on seal 208 that can cause outward seal movement. For example, as in FIG. 1A, typical window designs use an outer window pane 108 with an edge geometry that results in the edge being parallel to the window frame when outer window pane 108 is in an undeflected state, such as when the aircraft is on the ground. As this typical outer window pane 108 is deflected from pressurization loads, for example, while airborne at cruising altitude, outer pane 108 rotates at the edge, which causes an outward acting force to be applied to seal 102a, which typically results in seal movement.

As shown in FIG. 4, the geometry of feature 218 in accordance with an embodiment of the present invention is designed such that in the normal or undeflected position edge 402 of outer window pane 202 in gap 104 is at an angle or not parallel to edge 404 of window frame 406. As shown in dashed lines, the geometry of edge 402 of outer window pane 202 becomes substantially parallel to edge 404 of window frame 406 when outer window pane 202 has rotated to its maximum deflected state. In the parallel position, the application of any outward force on the portion of seal 208 in gap 104 is substantially reduced or eliminated.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A window assembly comprising:
   an outer window pane;
   an inner window pane;
   a window frame having a surface facing said outer window pane; and
   a seal interposed between said outer window pane and said window frame;
   wherein said outer window pane includes a surface adjacent an edge of said outer window pane, said outer window pane surface facing said window frame surface and being nonparallel to said window frame surface when said outer window pane is in an undeflected position, said outer window pane surface being configured to become parallel to said window frame surface when said outer window pane transitions from the undeflected position to a deflected position.

2. The window assembly of claim 1, further comprising a stiffening ring made integral with said seal.

3. The window assembly of claim 1, further comprising a clamping ring configured to restrain said seal about said outer and inner window panes.

* * * * *